United States Patent
Sharma et al.

(10) Patent No.: US 12,487,305 B2
(45) Date of Patent: Dec. 2, 2025

(54) APPARATUS AND METHOD TO ENABLE LOW POWER MAGNETIC RESONANCE PATIENT POSITIONING ON EDGE DEVICES

(71) Applicant: Shanghai United Imaging Intelligence Co., LTD., Shanghai (CN)

(72) Inventors: Abhishek Sharma, Cambridge, MA (US); Arun Innanje, Cambridge, MA (US); Ziyan Wu, Cambridge, MA (US); Terrence Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 540 days.

(21) Appl. No.: 17/939,251

(22) Filed: Sep. 7, 2022

(65) Prior Publication Data
US 2024/0077562 A1 Mar. 7, 2024

(51) Int. Cl.
*A61N 5/10* (2006.01)
*A61B 5/055* (2006.01)
*G01R 33/56* (2006.01)

(52) U.S. Cl.
CPC .......... *G01R 33/5608* (2013.01); *A61B 5/055* (2013.01); *A61N 5/1049* (2013.01); *A61N 2005/1055* (2013.01)

(58) Field of Classification Search
None
See application file for complete search history.

(56) References Cited

U.S. PATENT DOCUMENTS

| | | | |
|---|---|---|---|
| 6,169,884 B1 * | 1/2001 | Funk | H04B 1/3816 |
| | | | 455/522 |
| 7,206,567 B2 * | 4/2007 | Jin | H04M 1/677 |
| | | | 455/67.11 |
| 7,514,703 B2 * | 4/2009 | Iwakiri | G03B 42/02 |
| | | | 250/584 |
| 7,860,018 B2 * | 12/2010 | Raith | H04B 1/036 |
| | | | 455/574 |
| 8,175,545 B2 * | 5/2012 | Rofougaran | H04Q 9/00 |
| | | | 455/252.1 |

(Continued)

FOREIGN PATENT DOCUMENTS

CN 106598814 A 4/2017

*Primary Examiner* — David P Porta
*Assistant Examiner* — Djura Malevic
(74) *Attorney, Agent, or Firm* — Zhong Law, LLC

(57) ABSTRACT

A power management apparatus for a workflow to enable low power MR patient positioning on edge devices is disclosed. The power management apparatus changes an operational mode of an edge device from a first power mode to a second power mode after a defined time-interval. The power management apparatus further controls the edge device to capture a first image of a first scene. The power management apparatus further determines a trigger point based on a detection of a plurality of objects in the captured first image. The power management apparatus further changes the operational mode of the edge device from the second power mode to a third power mode to control a consumption of electric power while a set of operations is executed at the edge device. The operational mode of the edge device may be changed at the determined trigger point.

19 Claims, 5 Drawing Sheets

(56) References Cited

U.S. PATENT DOCUMENTS

| | | | |
|---|---|---|---|
| 8,735,835 B2* | 5/2014 | Caruba | G01R 33/481 |
| | | | 250/363.04 |
| 9,736,792 B2* | 8/2017 | Balasubramanian | |
| | | | H04W 52/367 |
| 10,009,549 B2* | 6/2018 | Omid-Zohoor | H04N 23/76 |
| 10,448,491 B1* | 10/2019 | Recker | H05B 47/105 |
| 10,499,478 B2* | 12/2019 | Recker | H05B 47/19 |
| 11,616,839 B2* | 3/2023 | Sharma | G16Y 40/20 |
| | | | 706/12 |
| 11,860,031 B2* | 1/2024 | Kwon | G01J 1/46 |
| 12,010,178 B2* | 6/2024 | Sharma | G06N 5/04 |
| 2003/0225955 A1* | 12/2003 | Feldstein | H04M 11/066 |
| | | | 710/306 |
| 2009/0055126 A1* | 2/2009 | Yanovich | G05B 19/41875 |
| | | | 702/179 |
| 2009/0228407 A1* | 9/2009 | Ramesh | G06N 5/02 |
| | | | 706/10 |
| 2011/0230163 A1* | 9/2011 | Jin | H04W 76/50 |
| | | | 455/556.1 |
| 2012/0076034 A1* | 3/2012 | Hoffman | H04W 24/08 |
| | | | 370/252 |
| 2012/0135681 A1* | 5/2012 | Adams | H04W 88/06 |
| | | | 455/41.1 |
| 2013/0053657 A1* | 2/2013 | Ziarno | A61B 1/042 |
| | | | 600/588 |
| 2013/0304405 A1* | 11/2013 | Schmid | A61B 5/0095 |
| | | | 702/56 |
| 2014/0097767 A1* | 4/2014 | Hsieh | H05B 47/10 |
| | | | 315/291 |
| 2014/0359534 A1* | 12/2014 | Zhao | G06F 3/04817 |
| | | | 715/846 |
| 2014/0359552 A1* | 12/2014 | Misra | G06F 8/60 |
| | | | 717/100 |
| 2014/0376773 A1* | 12/2014 | Holz | G06F 3/0304 |
| | | | 382/103 |
| 2015/0312125 A1* | 10/2015 | Subramanian | H04L 69/22 |
| | | | 709/224 |
| 2016/0027262 A1* | 1/2016 | Skotty | G08B 13/19632 |
| | | | 340/541 |
| 2016/0217388 A1* | 7/2016 | Okanohara | G06N 20/00 |
| 2017/0060574 A1* | 3/2017 | Malladi | H04W 4/70 |
| 2017/0064211 A1* | 3/2017 | Omid-Zohoor | H04N 23/651 |
| 2017/0277800 A1* | 9/2017 | Lucas | G06F 11/3698 |
| 2018/0300124 A1* | 10/2018 | Malladi | G06F 9/542 |
| 2018/0310389 A1* | 10/2018 | Recker | H02J 13/00006 |
| 2019/0036716 A1* | 1/2019 | Kasaragod | H04L 63/104 |
| 2019/0201104 A1* | 7/2019 | Shelton, IV | A61B 1/0005 |
| 2019/0201116 A1* | 7/2019 | Shelton, IV | A61B 34/76 |
| 2019/0201143 A1* | 7/2019 | Shelton, IV | A61B 34/25 |
| 2019/0205001 A1* | 7/2019 | Messerly | A61B 5/065 |
| 2019/0206004 A1* | 7/2019 | Shelton, IV | G16H 20/40 |
| 2019/0207911 A1* | 7/2019 | Wiener | G06F 8/65 |
| 2020/0151619 A1* | 5/2020 | Mopur | H04L 67/12 |
| 2020/0196842 A1* | 6/2020 | Lawrenson | G02B 27/4205 |
| 2020/0284883 A1* | 9/2020 | Ferreira | G01S 7/4914 |
| 2020/0285983 A1* | 9/2020 | Bhattacharyya | G06N 20/10 |
| 2020/0311559 A1* | 10/2020 | Chattopadhyay | G06N 5/01 |
| 2020/0327371 A1* | 10/2020 | Sharma | H04L 67/34 |
| 2020/0398054 A1* | 12/2020 | Errico | G16H 20/30 |
| 2022/0104822 A1* | 4/2022 | Shelton, IV | A61B 90/92 |
| 2022/0331054 A1* | 10/2022 | Kimball | G06T 11/00 |
| 2022/0364914 A1* | 11/2022 | Kwon | G01J 1/46 |
| 2023/0023083 A1* | 1/2023 | Shelton, IV | A61B 1/00006 |
| 2023/0190390 A1* | 6/2023 | Shelton, IV | G16H 20/40 |
| | | | 606/205 |
| 2023/0300195 A1* | 9/2023 | Sharma | G06F 18/251 |
| | | | 706/12 |
| 2024/0077562 A1* | 3/2024 | Sharma | H04N 23/651 |
| 2025/0022223 A1* | 1/2025 | Ren | G06T 17/05 |

* cited by examiner

APPARATUS AND METHOD TO ENABLE LOW POWER MAGNETIC RESONANCE PATIENT POSITIONING ON EDGE DEVICES

FIELD OF TECHNOLOGY

The aspects of the disclosed embodiments relate to electrical power optimization systems, and more specifically, to an apparatus and method for a workflow to enable low power magnetic resonance (MR) patient positioning on edge devices.

BACKGROUND

With recent advancements in various fields, such as medical diagnosis, self-driving vehicles, recommendation systems, and the like, specialized and advanced solutions, such as artificial intelligence (AI) capabilities, are being deployed for achieving maximized performance. For example, during a magnetic resonance (MR) scan procedure in an MR environment, various smart capabilities (such as human pose detection, object detection and gesture recognition) may be provided by implementing machine learning (ML) algorithms. Since such ML algorithms need to run continuously, a substantial amount of computation power may be consumed and consequently, a substantial amount of heat is also dissipated.

In high-power computing systems where such ML algorithms are implemented, the high power consumption and heat dissipation may be easily managed. However, in low-power edge devices, such high power consumption and heat dissipation may result in throttling or system shutdown. Existing solutions may dissipate such heat with a suitable cooling solution, for example, a fan or a liquid cooling mechanism. However, such cooling solutions may interfere with other processes in the environment, which may lead to undesirable results.

Further limitations and disadvantages of conventional and traditional approaches will become apparent to one of skill in the art, through comparison of such systems with some aspects of the disclosed embodiments as set forth in the remainder of the present disclosure with reference to the drawings.

SUMMARY

The aspects of the disclosed embodiments are directed to power management apparatuses and/or methods to enable low power MR patient positioning on edge devices, substantially as shown in and/or described in connection with at least one of the figures, as set forth more completely in the claims. An aim of the disclosed embodiments is to provide an improved power management apparatus and a method for reduced power consumption and higher heat dissipation by the edge device in a given environment.

According to a first aspect, the above and further implementations and advantages are obtained by a power management apparatus. In one embodiment, the apparatus includes a hardware processor configured to change an operational mode of an edge device from a first power mode to a second power mode after a defined time-interval; control the edge device to capture a first image of a first scene; determine a trigger point based on a detection of a plurality of objects in the captured first image; and change, at the trigger point, the operational mode of the edge device from the second power mode to a third power mode to control a consumption of electric power while a set of operations is executed at the edge device.

The disclosed power management apparatus is capable of dynamically changing the operational mode of the edge device based on the determination of the trigger point to reduce the consumption of the electric power by the edge device. The reduction in the consumption of the electric power may result in generation of less heat in comparison to the heat that may be generated by the edge device when operational in the high-power mode continuously. The disclosed power management apparatus may further result in electricity bill savings in comparison to conventional approaches.

These and other advantages, aspects and novel features of the present disclosure, as well as details of an illustrated embodiment thereof, will be more fully understood from the following description and drawings. It will be appreciated that features of the present disclosure are susceptible to being combined in various combinations without departing from the scope of the present disclosure as defined by the appended claims.

DETAILED DESCRIPTION OF THE DISCLOSURE

Various aspects of the disclosed embodiments may be found in a method and an apparatus for a workflow to enable low power MR patient positioning on edge devices. The various aspects of the disclosed embodiments provide a method and an apparatus that may correspond to a solution for reduction in the power consumption of edge devices used in a plurality of environments. The proposed power management apparatus and method may also be used to dissipate heat produced by the edge device as a result of the reduced power consumption.

Figure 1:
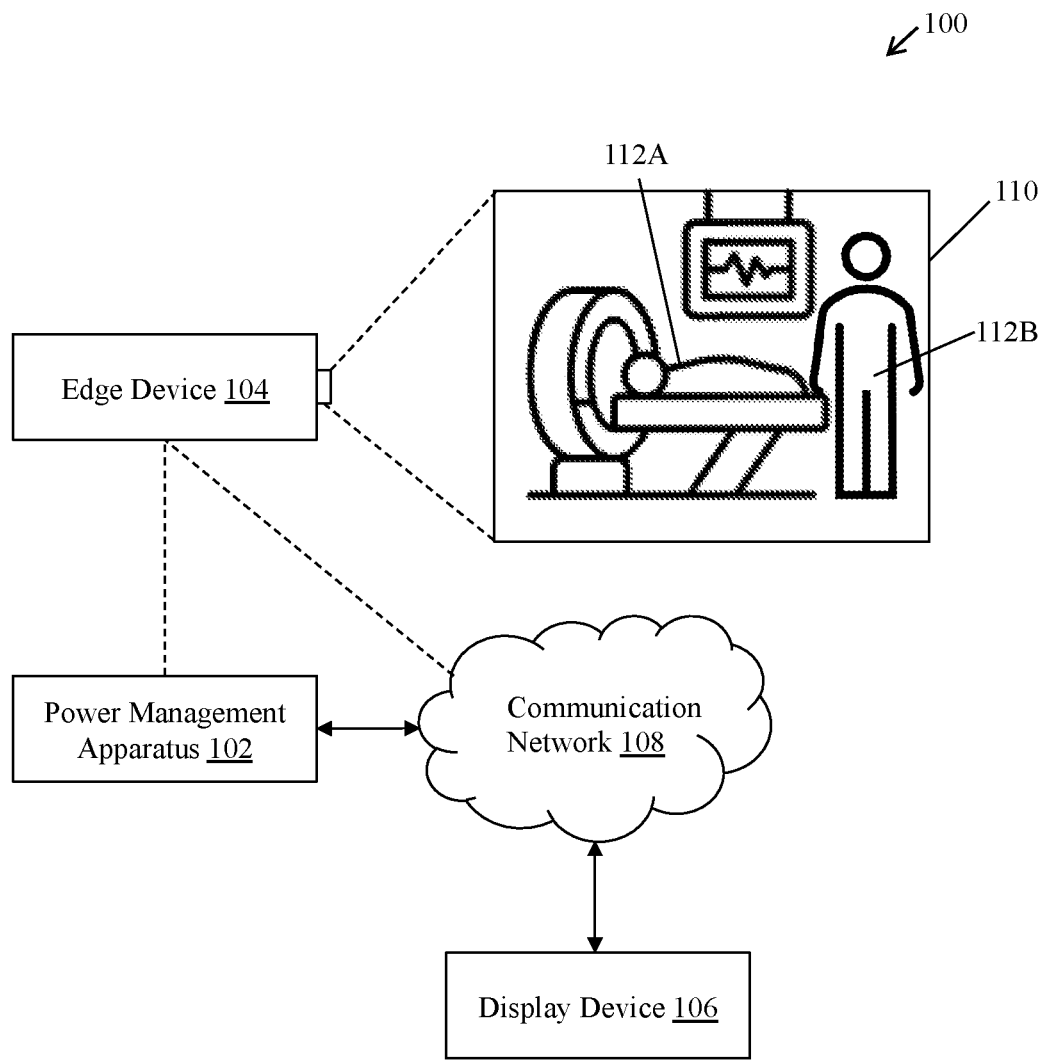
FIG. 1 is a block diagram that illustrates an exemplary environment for a workflow to enable low power MR patient positioning on edge devices, in accordance with an exemplary embodiment of the disclosure.

FIG. 1 is a block diagram that illustrates an exemplary environment for a workflow to enable low power MR patient positioning on edge devices, in accordance with an exemplary embodiment of the disclosure. Referring to FIG. 1, there is shown a network environment 100, which may include a power management apparatus 102 that includes an edge device 104. With reference to FIG. 1, there is further shown a display device 106 and a communication network 108. There is further shown a first image 110 and a plurality of objects, such as a first object 112A and a second object 112B. In an embodiment, the edge device 104 may be integrated within the power management apparatus 102.

Figure 2:
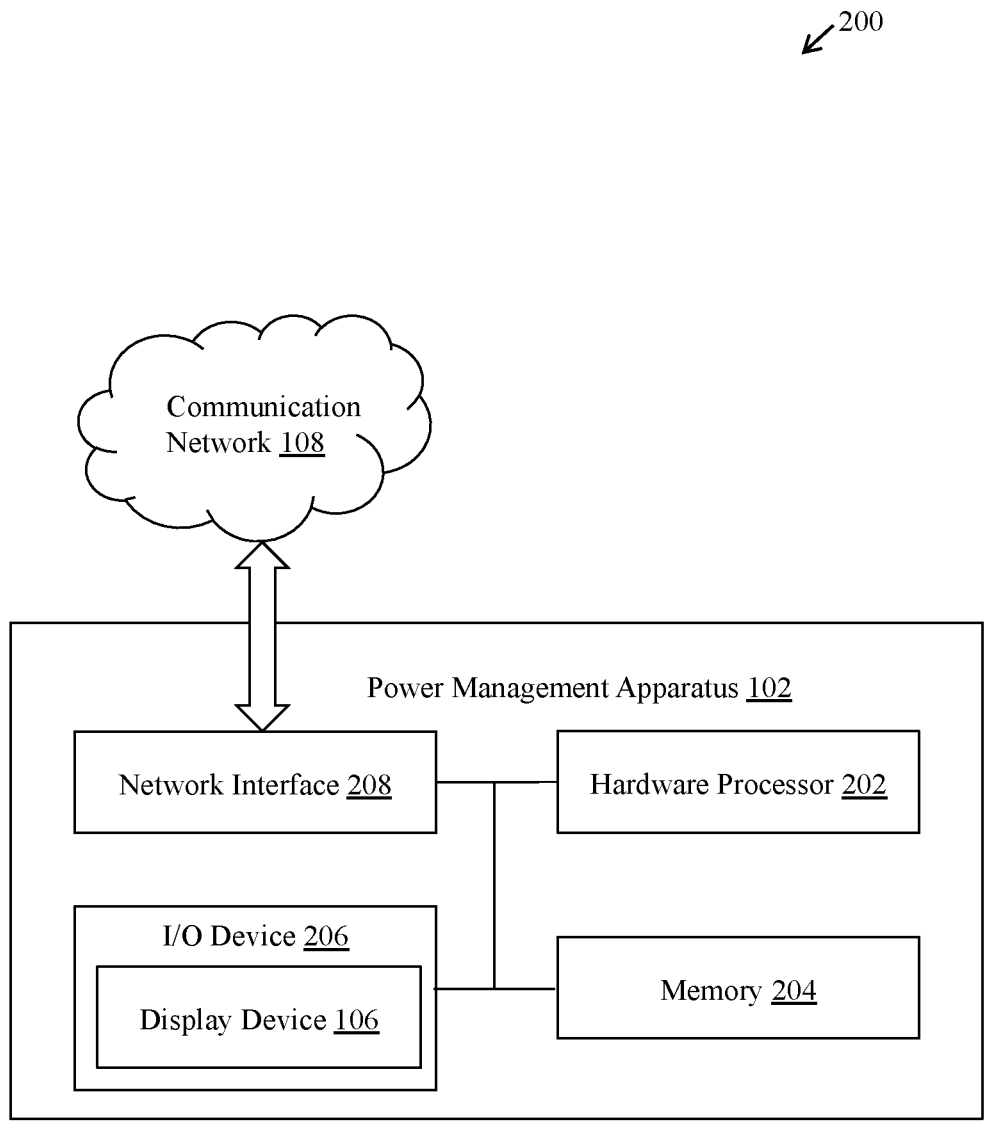
FIG. 2 is a block diagram that illustrates an exemplary power management apparatus for a workflow to enable low power MR patient positioning on edge devices, in accordance with an embodiment of the disclosure.

Referring also to FIG. 2, the power management apparatus 102 includes a hardware processor 202 configured to change an operational mode of an edge device 104 from a first power mode to a second power mode after a defined time-interval; control the edge device 104 to capture a first image of a first scene; determine a trigger point based on a detection of a plurality of objects in the captured first image; and change, at the trigger point, the operational mode of the edge device 104 from the second power mode to a third power mode to control a consumption of electric power while a set of operations is executed at the edge device 104.

In contrast to conventional approaches, where the edge device 104 continuously operates in a high power mode, the disclosed power management apparatus 102 may change an operational mode of the edge device 104 (for example, a camera) from a first power mode (for example, a sleep mode) to a second power mode (for example, a low power mode) after a defined time-interval (for example, 5 seconds). Further, as a trigger point is determined, the disclosed power management apparatus 102 may change the operational mode of the edge device 104 from the second power mode to a third power mode (for example, a high power mode) in which the edge device 104 may execute the set of operations). The consumption of electric power by the edge device 104 in the high power mode may be more than the consumption of the electric power by the edge device 104 in the low power mode. In case, the trigger point is not determined, the power management apparatus 102 may change the operational mode of the edge device 104 from the second power mode back to the first power mode. The consumption of the electric power by the edge device 104 in the sleep mode may be less than the consumption of the electric power by the edge device 104 in the low power mode.

Therefore, the disclosed power management apparatus 102 may be capable of dynamically changing the operational mode of the edge device 104 based on the determination of the trigger point to reduce the consumption of the electric power by the edge device 104. The reduction in the consumption of the electric power may result in generation of less heat in comparison to the heat that may be generated by the edge device when operational in the high power mode continuously. Thus, the power management apparatus 102 may be useful in scenarios where active e heat sinks might not be used (for example, in MRI environment). Moreover, the disclosed power management apparatus 102 may also result in electricity bill savings in comparison to conventional approaches.

The power management apparatus 102 may comprise suitable logic, circuitry, interfaces, and/or code that may be configured to control a consumption of electric power by the edge device 104. In some embodiments, the power management apparatus 102 may be further configured to determine a trigger point and change the operational mode of the edge device 104. Accordingly, the power management apparatus 102 may be configured to operational mode control the consumption of electric power by the edge device 104. The power management apparatus 102 may be further configured to control the edge device 104 to capture the first image 110 of a first scene, store the captured first image 110, and/or generate an output.

The power management apparatus 102 may be implemented as a cloud server and may execute operations through web applications, cloud applications, HTTP requests, repository operations, file transfer, and the like. Other example implementations of the power management apparatus 102 may include, but are not limited to, a database server, a file server, a web server, a media server, an application server, a mainframe server, or a cloud computing server. In at least one embodiment, the power management apparatus 102 may be implemented as a plurality of distributed cloud-based resources by use of several technologies that are well known to those ordinarily skilled in the art.

The edge device 104 may comprise suitable logic, circuitry, interfaces, and/or code that may be configured to capture the first image 110 of the first scene, which may be within a field-of-view (FOV) of the edge device 104. The edge device 104 may be further configured to execute a set of operations. In an embodiment, the edge device 104 may correspond to an image sensor-based electronic device. The image sensor-based electronic device may have an integrated image sensor that may capture the first image 110. Specifically, the image sensor may include a lens assembly that may be configured to capture the first image 110 from the FOV of the image sensor. The image sensor may be realized by use of a charge-coupled device (CCD) technology, complementary metal-oxide-semiconductor (CMOS) technology, or the like. Examples of implementations of the image sensor may include, but are not limited to, at least a closed circuit television (CCTV) camera, a digital camera, a camcorder, an action camera, a time-of-flight camera (ToF camera), a night-vision camera, and/or other image capture devices. Examples of the edge device 104 may include, but are not limited to, a medical scanner (such as a Magnetic Resonance Imaging (MRI) scanner, a Computed Tomography (CT) scanner) a computing device, a mainframe machine, a server, a computer workstation, a smartphone, a cellular phone, a mobile phone, a gaming device, a Consumer Electronic (CE) device, and other computing devices.

A person with ordinary skill in the art will understand that the scope of the disclosure may not be limited to the implementation of the power management apparatus 102 and the edge device 104 as two separate entities. In certain embodiments, the functionalities of the power management apparatus 102 can be incorporated in its entirety or at least partially in the edge device 104, without a departure from the scope of the disclosure.

The display device 106 may comprise suitable logic, circuitry, and interfaces that may be configured to display the output that may be generated based on the execution of the set of operations at the edge device 104. The display device 106 may be a touch screen which may enable the user to provide user inputs (such as a first user input and a second user input) via the display device 106. The touch screen may be at least one of a resistive touch screen, a capacitive touch screen, or a thermal touch screen. The display device 106 may be realized through several known technologies. Examples of such technologies may include, but are not limited to, at least one of a Liquid Crystal Display (LCD) display, a Light Emitting Diode (LED) display, a plasma display, or an Organic LED (OLED) display technology, or other display devices.

A person with ordinary skill in the art will understand that the scope of the disclosure may not be limited to the implementation of the power management apparatus 102, the edge device 104, and the display device 106 as three separate entities. In certain embodiments, the functionalities of the power management apparatus 102 and the display device 106 can be incorporated in its entirety or at least partially in the edge device 104, without a departure from the scope of the disclosure.

The communication network 108 may include a communication medium through which the power management apparatus 102, the edge device 104, and the display device 106 may communicate with each other. The communication network 108 may be one of a wired connection or a wireless connection. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the edge device 104, which may correspond to the image sensor-based electronic device, may be configured to operate initially in a first power mode. The first power mode may correspond to a sleep mode (also referred to as standby mode, suspend mode, or suspend to RAM mode). In the sleep mode, at least one core of one or more cores of a hardware processor integrated within the edge device 104 is disabled. The power management apparatus 102 may also disable or drastically reduce the supply of electric power to at least one component of one or more components (such as the image sensor) of the edge device 104 whose operations may not be required to control the consumption of electric power. After a defined time-interval (for example, 5 seconds), the power management apparatus 102 may be configured to change the operational mode of the edge device 104 from the first power mode to a second power mode. In an embodiment, the second power mode may correspond to a low power mode. In the low power mode, the power management apparatus 102 may be configured to control the edge device 104 to capture the first image 110 of the first scene, which may be associated with a medical scanning environment (such as an MRI environment).

The operational mode of the edge device 104 may be changed from the first power mode to the second power mode based on a change in a supply of the electric power to at least one component of one or more components of the power management apparatus 102 for controlled consumption of the electric power. Specifically in the low power mode, the power management apparatus 102 may enable at least one core of the one or more cores of the hardware processor 202 that may be disabled in the sleep mode (or the first power mode). The power management apparatus 102 may also change (or increase) the supply of electric power to the at least one component of the one or more components of the edge device 114.

The power management apparatus 102 may be configured to apply one or more object detection operations on the captured first image 110 of the first scene. Based on the application of the one or more object detection operations on the captured first image 110, the power management apparatus 102 may be configured to detect the plurality of objects in the captured first image 110. In an embodiment, the plurality of objects may include a living object or a non-living object. Examples of a living object may include, but are not limited to, a human (such as a patient, a technician, or the like), an animal, and the like. Examples of non-living objects may include, but are not limited to, a chair, a table, a bed, an equipment, and the like.

Based on the detection of the plurality of objects in the captured first image 110, the power management apparatus 102 may be configured to determine a trigger point. In an embodiment, the plurality of objects may include at least the first object 112A that is being scanned and the second object 112B that is designated to perform a scan on the first object 112A in the medical scanning environment. Details about the one or more object detection operations are provided, for example, in FIG. 3 and FIG. 4.

Based on the determination of the trigger point, the power management apparatus 102 may be configured to change the operational mode of the edge device 104 from the second power mode to a third power mode. The third power mode may correspond to a high power mode. In an embodiment, the power management apparatus 102 change the operational mode of the edge device 104 from the second power mode to the third power mode to control the consumption of electric power by the edge device 104 while a set of operations is executed at the edge device 104. In the third power mode, the power management apparatus 102 may enable each of the one or more cores of the hardware processor 202 that may be disabled in the low power mode. The power management apparatus 102 may also further increase or maximize the supply of electric power to all the components of the edge device 114. Therefore, the consumption of the electric power may be more in the third power mode as compared to the second power mode and the first power mode. Details about the set of operations are provided, for example, in FIG. 3.

FIG. 2 is a block diagram that illustrates an exemplary power management apparatus for a workflow to enable low power MR patient positioning on edge devices, in accordance with an embodiment of the disclosure. FIG. 2 is explained in conjunction with elements from FIG. 1. With reference to FIG. 2, there is shown a block diagram 200 of the power management apparatus 102. The power management apparatus 102 may include the hardware processor 202, a memory 204, an input/output (I/O) device 206, and a network interface 208. The hardware processor 202 may be communicatively coupled to the memory 204, the I/O device 206, and the network interface 208. In accordance with an embodiment, the I/O device 206 may further include the display device 106.

The hardware processor 202 may include suitable logic, circuitry, and interfaces that may be configured to execute program instructions associated with different operations to be executed by the power management apparatus 102. For example, some of the operations may include, but are not limited to, changing the operational mode of the edge device 104, controlling the edge device 104 to capture the first image 110, and determination of the trigger point. The hardware processor 202 may include one or more specialized processing units, which may be implemented as an integrated processor or a cluster of processors that perform the functions of the one or more specialized processing units, collectively.

The hardware processor 202 may be implemented based on a number of processor technologies known in the art. Examples of implementations of the hardware processor 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC)

processor, a microcontroller, a central processing unit (CPU), and/or other computing circuits.

The memory 204 may include suitable logic, circuitry, interfaces, and/or code that may be configured to store the program instructions to be executed by the hardware processor 202. In at least one embodiment, the memory 204 may store the first image 110. The memory 204 may also store a value of the defined time-interval and the set of operations to be executed at the edge device 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive one or more user inputs and provide an output. For example, the power management apparatus 102 may receive the first user input and the second user input, via an input device, such as a touch screen, from the I/O device 206. The I/O device 206 may further display the output, via an output device, such as the display device 106, from the I/O device 206. The I/O device 206 which includes various input and output devices, may be configured to communicate with the hardware processor 202. Examples of the I/O device 206 may include, but are not limited to, a touch screen, a keyboard, a mouse, a joystick, a microphone, a display device (such as the display device 106), and a speaker.

The network interface 208 may include suitable logic, circuitry, and interfaces that may be configured to facilitate a communication between the hardware processor 202, the edge device 104, and the display device 106, via the communication network 108. The network interface 208 may be implemented by use of various known technologies to support wired or wireless communication of the power management apparatus 102 with the communication network 108. The network interface 208 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The functions or operations executed by the power management apparatus 102, as described in FIG. 1, may be performed by the hardware processor 202. Various operations executed by the hardware processor 202 are described in detail, for example, in FIGS. 3, 4, and 5.

Figure 3:
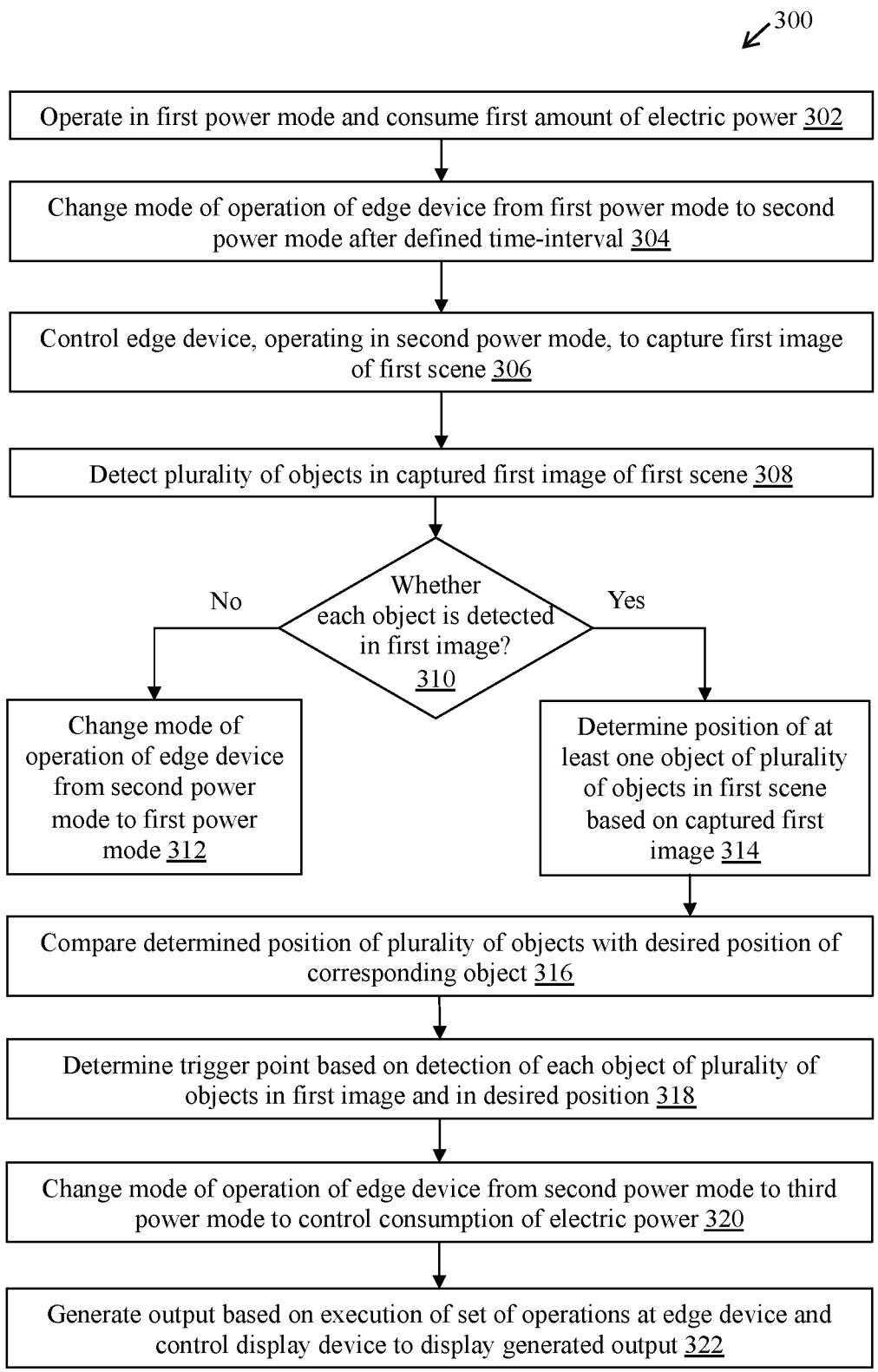
FIG. 3 is a flowchart that illustrates exemplary operations for a workflow to enable low power MR patient positioning on edge devices, in accordance with an embodiment of the disclosure.

FIG. 3 is a flowchart that illustrates exemplary operations for a workflow to enable low power MR patient positioning on edge devices, in accordance with an embodiment of the disclosure. FIG. 3 is explained in conjunction with elements from FIG. 1 and FIG. 2. With reference to FIG. 3, there is shown a flowchart 300 that illustrates exemplary operations from 302 to 322, as described herein. The exemplary operations illustrated in the flowchart 300 may start at 302 and may be performed by any computing system, apparatus, or device, such as the hardware processor 202 of the power management apparatus 102 in FIG. 2. Although illustrated with discrete blocks, the exemplary operations associated with one or more blocks of the flowchart 300 may be divided into additional blocks, combined into fewer blocks, or eliminated, depending on the particular implementation.

At 302, a first amount of the electric power is consumed by the edge device 104 in the first power mode. In an embodiment, the edge device 104 may be configured to operate in the first power mode and consume the first amount of the electric power. In an embodiment, the first power mode may correspond to a sleep mode (also referred to as the standby mode, the suspend mode or the suspend to RAM mode). In the first power mode, the edge device 104 may consume a first amount of electric power. In an embodiment, the first amount of electric power may be required by the edge device 104 to receive one or more commands from the power management apparatus 102. Such one or more commands may include a first command to change the operational mode of the edge device 104, a second command to initialize the edge device 104 to perform one or more operations, and the like. In the first power mode, at least one core of the one or more cores of the hardware processor 202 may be disabled and the electric power supply to at least one of the one more components of the edge device 104 may be the least or the minimal. Therefore, the first amount of the electric power is consumed by the edge device 104 in the first power mode in comparison to the amount of the electric power is consumed by the edge device 104 in the second power mode and the third power mode where the one or more cores of the hardware processor 202 may be enabled and the electric power supply to at least one of the one more components of the edge device 104 may be increased. At 304, an operational mode of the edge device 104 may be changed from the first power mode to a second power mode. The operational mode of the edge device 104 may be changed after a defined time-interval. In an embodiment, the power management apparatus 102 may be configured to change the operational mode of the edge device 104 from the first power mode to the second power mode after the defined time-interval. The defined time-interval may be set during an initialization phase of the power management apparatus 102.

In another embodiment, the power management apparatus 102 may be configured to receive a first user input from a user (for example, a technician) via the display device 106. The first user input may be associated with an initiation of an execution of a set of operations on the edge device 104. Based on the reception of the first user input, the power management apparatus 102 may be configured to change the operational mode of the edge device 104 from the first power mode to the second power mode. Therefore, the disclosed power management apparatus 102 may be capable of changing the operational mode of the edge device 104 automatically after the defined time-interval and also provide a provision to manually change the operational mode of the edge device 104.

In an embodiment, the second power mode may correspond to a low power mode. In the second power mode, the edge device 104 may consume a second amount of electric power. The second amount of the electric power consumed by the edge device 104 may be more than the first amount of electric power consumed by the edge device 104 while operating in the first power mode.

In an embodiment, the operational mode of the edge device 104 may be changed from the first power mode to the second power mode based on a change in the supply of electric power to at least one component of one or more components of the power management apparatus 102. As an example, in the second power mode, the electric power supply to at least one of the one more components of the edge device 104 may be increased. Also, in the second power mode, at least one core of the one or more cores of the hardware processor 202 that may be disabled in the first power mode may be enabled. Therefore, the second amount of the electric power is consumed by the edge device 104 operating in the second power mode may be more than the first amount of electric power consumed by the edge device 104 while operating in the first power mode.

In another embodiment, the value of the defined time-interval may be modified. The power management apparatus 102 may be configured to receive a second user input associated with the defined time-interval. Based on the reception of the second user input, the power management apparatus 102 may configured to modify a value of the defined time-interval from a first value to a second value that may be indicated in the received second user input. For example, if the first value of the defined time-interval is 5 seconds and the second value of the defined time-interval is 3 seconds as indicated in the received second user input, then the power management apparatus 102 may be configured to modify the value of the defined time-interval from 5 seconds to 3 seconds.

At 306, an edge device control operation may be performed. In the edge device control operation, the power management apparatus 102 may be configured to control the edge device 104, operating in the second power mode, to capture the first image 110 of a first scene. In an embodiment, the first scene may be associated with a medical scanning environment. The medical scanning environment may correspond to an environment in which a medical scanning (or imaging) may be performed on a subject. By way of example and not limitation, different types of medical scanning (or imaging) operations may include radiography, MRI, nuclear medicine, ultrasound, elastography, photo acoustic imaging, tomography, echocardiography, and magnetic particle imaging.

In an embodiment, the power management apparatus 102 may transmit a first request to the edge device 104 to capture the first image 110. The edge device 104 may receive the first request and control an image sensor installed in the edge device 104 to capture the first image 110. The edge device 104 may capture the first image 110 and store in the memory 204 of the edge device 104. In an embodiment, the power management apparatus 102 may be configured to control the edge device 104 to capture the first image 110 based on the reception of the first user input.

At 308, an object detection operation may be executed. In the object detection operation, the power management apparatus 102 may be configured to detect the plurality of objects in the captured first image 110 of the first scene. To detect the plurality of objects in the captured first image 110, the power management apparatus 102 may apply one or more object detection operations on the captured first image 110. In an embodiment, each of the one or more object detection operations may correspond to an ML algorithm which may use at least one pre-trained neural network model to detect the plurality of objects in the captured first image 110. Examples of the pre-trained neural network models may include, but are not limited to, a convolutional neural network (CNN), a fully convolutional network (FCN), Regions with CNN (R-CNN), Fast R-CNN, Faster R-CNN, a You Only Look Once (YOLO) network, a Residual Neural Network (Res-Net), a Feature Pyramid Network (FPN), a Retina-Net, a Single Shot Detector (SSD), and/or a variant thereof.

In accordance with an embodiment, the plurality of objects may include the first object 112A and the second object 112B. In an embodiment, the first object 112A may correspond to an object that is being scanned in the medical scanning environment and the second object 112B may correspond to the object that may be designated to perform a scan on the first object 112A in the medical scanning environment. As an example, the first object 112A may correspond to a patient who is being scanned and the second object 112B may correspond to a technician who may be designated to perform the scan on the patient in the medical scanning environment.

In another embodiment, the second object 112B may correspond to an object on which the first object 112A may be laying (or sitting) so that the medical scan may be performed on the first object 112A. For example, in the MRI environment, the second object 112B may correspond to a patient table on which the first object 112A may lay to get scanned.

In another embodiment, the power management apparatus 102 may configured to control the edge device 104 to apply the one or more object detection operations on the captured first image 110 of the first scene to detect the plurality of objects in the first image 110. In such an embodiment, the edge device 104, operating in the second power mode, may detect the plurality of objects in the captured first image 110 and transmit a first signal or a second signal to the power management apparatus 102 associated with the detection of the plurality of objects in the first image 110. Specifically, the first signal may be transmitted to the power management apparatus 102 if the first object 112A and the second object 112B are detected. Otherwise, the edge device 104 may transmit a second signal to the power management apparatus 102 if only one object or no object is detected in the first image 110.

At 310, it may be determined whether each object of the plurality of objects is detected in the first image 110. In accordance with an embodiment, the power management apparatus 102 may determine whether the first object 112A and the second object 112B are detected in the first image 110 of the first scene. In case, both the first object 112A and the second object 112B are not detected in the first image 110, the control may be transferred to 312. Otherwise the control may be transferred to 314. In another embodiment, if the first signal is received from the edge device 104 by the power management apparatus 102, then the control may be transferred to 314. In another embodiment, if the second signal is received from the edge device 104 by the power management apparatus 102, then the control may be transferred to 312.

At 312, the operational mode of the edge device 104 may be changed from the second power mode to the first power mode. The power management apparatus 102 may be configured to change the operational mode of the edge device 104 from the second power mode to the first power mode. The power management apparatus 102 may change the operational mode of the edge device 104 for the defined time-interval based on the determination that the plurality of objects are not detected in the first image 110.

In an embodiment, the operational mode of the edge device 104 may be changed from the second power mode (or the third power mode) to the first power mode based on switching the power management apparatus 102 to a sleep mode (or the first power mode) for the defined time-interval. In another embodiment, the operational mode of the edge device 104 may be changed from the second power mode (or the third power mode) to the first power mode based on disabling at least one core of the one or more cores of the hardware processor 202 for the defined time-interval. In an embodiment, the operational mode of the edge device 104 may be changed from the second power mode (or the third power mode) to the first power mode based on a change in the supply of electric power to at least one component of one or more components of the power management apparatus 102 for the controlled consumption of the electric power. Specifically, the operational mode of the edge device 104 may be changed from the second power mode (or the third power mode) to the first power mode based on reducing or minimizing the supply of electric power to at least one component of one or more components of the power management apparatus 102 for the controlled consumption of the electric power.

At 314, a position determination operation may be performed. In the position determination operation, the power management apparatus 102 may be configured to determine a position of at least one object of the plurality of objects in the first scene based on the captured first image 110. In case the first object 112A corresponds to the patient and the second object 112B corresponds to the patient table, then the power management apparatus 102 may determine a position of the patient to determine whether the patient is lying on the patient table in the medical scanning environment. In another embodiment, if the second object 112B corresponds to the technician, then the power management apparatus 102 may be configured to determine a position of the technician (i.e., the second object 112B) with respect to the patient (i.e., the first object 112A). In an embodiment, the power management apparatus 102 may be configured to apply one or more ML algorithms on the captured first image 110 to determine the position of at least one object of the plurality of objects in the first scene. In another embodiment, the power management apparatus 102 may be configured to determine the position of at least one object of the plurality of objects in the first scene based on depth data associated with the first image 110.

At 316, a position comparison operation may be performed. In the position comparison operation, the power management apparatus 102 may be configured to compare the determined position of the plurality of objects with a desired position of the corresponding object. For example, the desired position of the first object 112A may be on the patient bed. In case the second object 112B corresponds to the technician, then the desired position of the technician may be near to the patient but away from a scanning device placed in the medical scanning environment. In case the second object 112B corresponds to the patient bed, then the desired position of the first object 112A may be on the patient bed. In case the determined position of each object is same as the desired position of the corresponding object, then the control may be transferred to 318. Otherwise, the control may be transferred back to 312.

At 318, a trigger point determination operation may be performed. In accordance with an embodiment, the power management apparatus 102 may be configured to determine the trigger point. The trigger point may be determined based on the detection of each object of the plurality of objects in the first image 110 and in the desired position. In an embodiment, the trigger point may correspond to a timestamp at which each object of the plurality of objects is detected in the desired position.

At 320, the operational mode of the edge device 104 may be changed from the second power mode to a third power mode. In accordance with an embodiment, the power management apparatus 102 may be configured to change the operational mode of the edge device 104 from the second power mode to the third power mode. In the third power mode, the edge device 104 may execute a set of operations that may be associated with the scanning of the first object 112A in the medical scanning environment. For example, the set of operations may be associated with an actual MRI scan in the medical scanning environment. As another example, the set of operations may include, but are not limited to, a pose detection operation, a gesture recognition operation, and the like.

In an embodiment, the edge device 104 may consume a third amount of the electric power in the third power mode. The third amount of electric power may be consumed by the edge device 104 to execute the set of operations. The third amount of the electric power may be greater than the second amount of the electric power consumed by the edge device 104 in the second power mode. The third amount of the electric power may be consumed by the edge device 104 to execute the set of operations on the edge device 104. In the third power mode, each of the one or more cores of the hardware processor 202 that may be disabled in the second power mode or the first power mode, may be enabled and the electric power supply to each of the one more components of the edge device 104 may be further increased or maximized for the controlled consumption of the electric power. Therefore, the third amount of the electric power is consumed by the edge device 104 operating in the third power mode may be more than the second amount of electric power consumed by the edge device 104 while operating in the second power mode and the first amount of electric power consumed by the edge device 104 while operating in the first power mode.

At 322, an output may be generated based on the execution of the set of operations at the edge device 104. In the output rendering operation, the power management apparatus 102 may be configured to generate an output based on the execution of the set of operations at the edge device 104. In an embodiment, the set of operations may be executed on the captured first image 110. In another embodiment, the edge device 104 may be configured to continuously capture a set of images of the first scene and execute the set of operations on the captured set of images to generate the output. The generated output may correspond to a scan result associated with the medical scanning environment. The power management apparatus 102 may be further configured to control the display device 106 to display the generated output.

Therefore, the disclosed power management apparatus may be configured to dynamically switch the edge device 104 between different modes of operation based on a determination of the trigger point or after the defined time-interval. Such switching may result in conservation of electric power and reduction in electrical expenses. Moreover, with the continuous switching between different modes of operation, the heat generated by the edge device 104 may be less and dissipated quickly. Thus, the disclosed power management apparatus may provide solution for both the power consumption and heat dissipation in the edge device 104.

Although the above description for reducing power consumption of the edge device 104 is described with reference to the medical scanning environment, it may be noted that the present disclosure may not be so limited, and the present disclosure may be applicable to other environments as well, such as smart surveillance systems for thief or firearms detection, automated license plate recognition (ALPR) systems, three dimensional (3D) modelling systems, robotics, video processing, smart video analytics, autonomous driving, machine vision, industrial inspection, and the like. The description for reducing power consumption of the edge device 104 in the above mentioned scenarios has been omitted from the disclosure for the sake of brevity.

It may be further noted that the present disclosure may be applicable to all types of devices irrespective of their computation power. For example, the present disclosure may be applicable to servers, mainframe machines, and the like.

Figure 4:
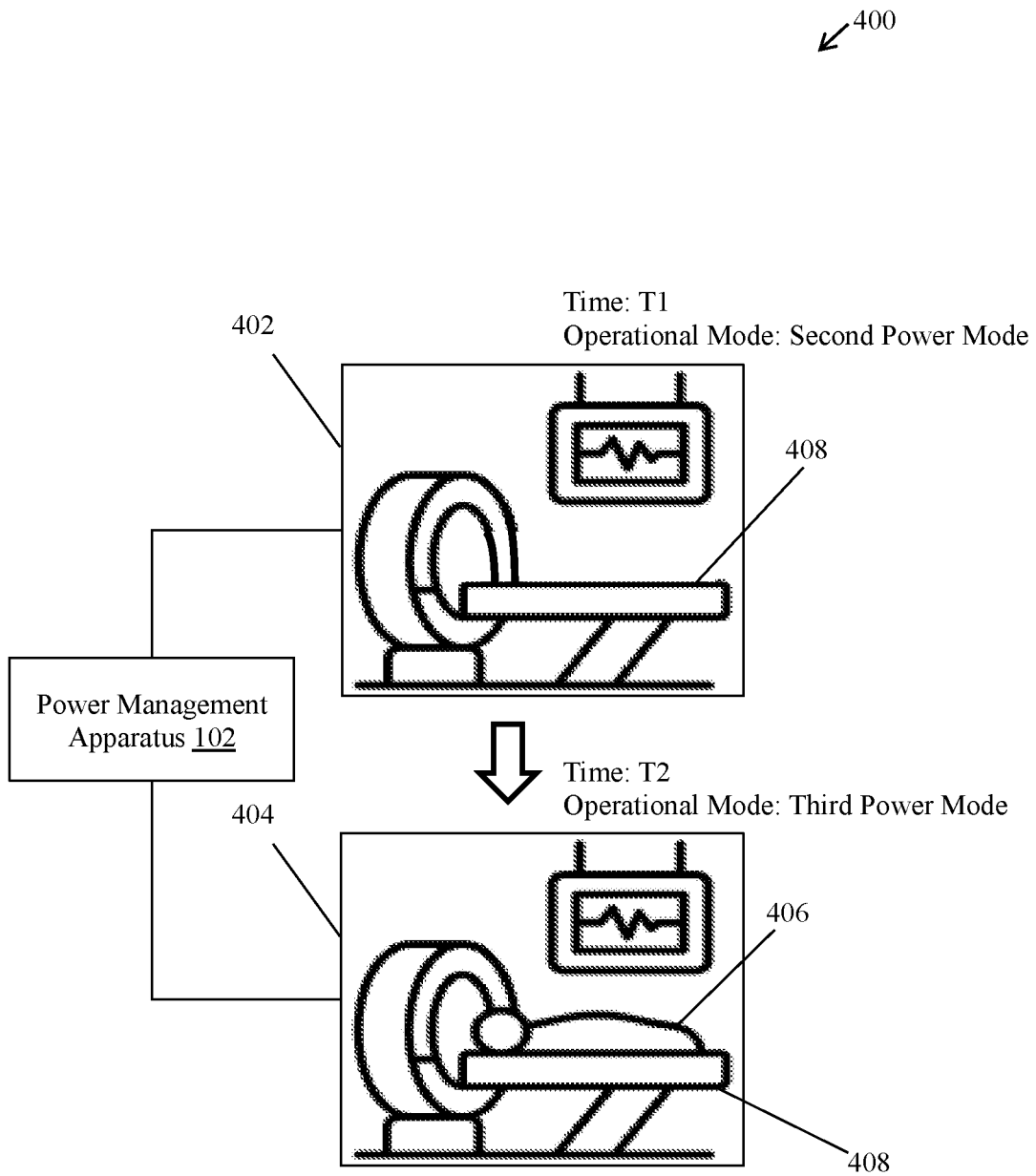
FIG. 4 is a diagram that illustrates an exemplary scenario of changing the operational mode of the edge device, in accordance with an embodiment of the disclosure.

FIG. 4 is a diagram that illustrates an exemplary scenario of changing the operational mode of the edge device, in accordance with an embodiment of the disclosure. FIG. 4 is explained in conjunction with elements from FIGS. 1, 2, and 3. With reference to FIG. 4, there is shown an exemplary scenario 400 depicting a first image 402 of a first scene at time T1 and a second image 404 of the first scene at time T2.

At time T1, the power management apparatus 102 may be configured to change the operational mode of the edge device 104 from a first power mode to a second power mode after a defined time-interval. The power management apparatus 102 may further control the edge device 104 to capture the first image 402 of the first scene. The power management apparatus 102 may further detect a plurality of objects in the first image 402 based on an application of the one or more object detection operations on the captured first image 402 of the first scene. Details about the one or more object detection operations are provided, for example, in FIG. 3.

In an embodiment, the power management apparatus 102 may be configured to determine whether the plurality of objects is detected in the captured first image 402. As depicted in FIG. 4, the power management apparatus 102 may detect only the second object 408 in the first image 402. Since, the first object 406 is not detected in the first image 402, the power management apparatus 102 may determine that the plurality of objects are not detected in the captured first image 402. Based on such determination, the power management apparatus 102 may change the operational mode of the edge device 104 from the second power mode to the first power mode. Accordingly, the power management apparatus 102 may change the operational mode of the edge device 104 from the second power mode to the first power mode for the defined time-interval.

At time T2, the power management apparatus 102 may be configured to change the operational mode of the edge device 104 from the second power mode to the third power mode. In an embodiment, time T2 may be after the defined time-interval from time T1. The power management apparatus 102 may further control the edge device 104 to capture the second image 404 of the first scene. The power management apparatus 102 may further detect the plurality of objects in the second image 404 based on the application of the one or more object detection operations on the captured second image 404 of the first scene.

In case of the second image 404, the power management apparatus 102 may detect both the first object 406 and the second object 408 in the second image 404. Based on the detection of the plurality of objects in the second image 404, the power management apparatus 102 may be configured to change the operational mode of the edge device 104 from the second power mode to the third power mode. In an embodiment, the operational mode of the edge device 104 may be changed from the second power mode to the third power mode for a first time period or until a user input is received to change the operational mode back to the first power mode or the second power mode.

Figure 5:
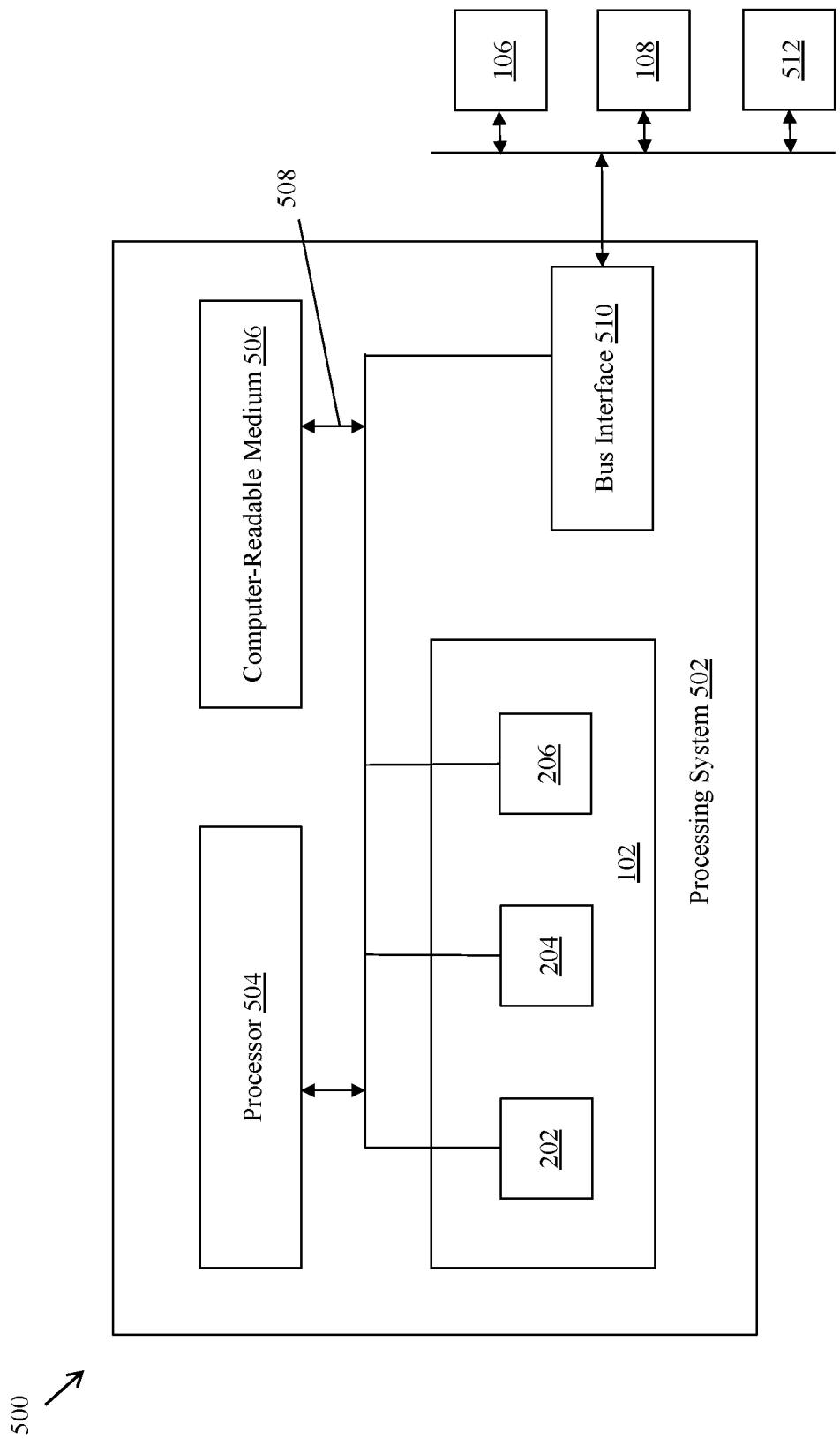
FIG. 5 is a conceptual diagram illustrating an example of a hardware implementation for a processing system used for a workflow to enable low power MR patient positioning on edge devices, in accordance with an exemplary embodiment of the disclosure.

FIG. 5 is a conceptual diagram illustrating an example of a hardware implementation for a processing system used for a workflow to enable low power MR patient positioning on edge devices, in accordance with an exemplary embodiment of the disclosure. Referring to FIG. 5, the hardware implementation shown by a representation 500 for the network environment 100 employs a processing system 502 for a workflow to enable low power MR patient positioning on edge devices, in accordance with an exemplary embodiment of the disclosure, as described herein.

In some examples, the processing system 502 may comprise one or more instances of a processor 504, a non-transitory computer-readable medium 506, a bus 508, a bus interface 510, and a transceiver 512.

The processor 504, such as the hardware processor 202, may be configured to manage the bus 508 and general processing, including the execution of a set of instructions stored on the computer-readable medium 506. The set of instructions, when executed by the processor 504, causes the power management system 102 to execute the various functions described herein for any particular apparatus. The processor 504 may be implemented, based on a number of processor technologies known in the art. Examples of the processor 504 may be RISC processor, ASIC processor, CISC processor, and/or other processors or control circuits.

The non-transitory computer-readable medium 506 may be used for storing data that is manipulated by the processor 504 when executing the set of instructions. The data is stored for short periods or in the presence of power.

The bus 508 may be configured to link together various circuits. In this example, the network environment 100 employing the processing system 502 and the non-transitory computer-readable medium 506 may be implemented with bus architecture, represented generally by bus 508. The bus 508 may include any number of interconnecting buses and bridges depending on the specific implementation of the power management apparatus 102 and the overall design constraints. The bus interface 510 may be configured to provide an interface between the bus 508 and other circuits, such as the transceiver 512, and external devices, such as the edge device 104, and the display device 106.

The transceiver 512 may be configured to provide a communication of the power management apparatus 102 with various other apparatus, such as the edge device 104, via a network. The transceiver 512 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as 5th generation mobile network, Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software whose corresponding code may be executed by at least one processor, for across multiple processing environments.

In an aspect of the disclosure, the processor 504, the non-transitory computer-readable medium 506, or a combination of both may be configured or otherwise specially programmed to execute the operations or functionality of the hardware processor 202, the memory 204, the I/O device 206, and the network interface 208, or various other components described herein, as described with respect to FIGS. 1 to 5.

Various embodiments of the disclosure comprise the power management apparatus 102 that may be configured to provide a workflow to enable low power MR patient positioning on edge devices. The power management apparatus 102 may comprise, for example, the hardware processor 202, the memory 204, the I/O device 206, and the network interface 208. The hardware processor 202 of the power management apparatus 102 may be configured to change an operational mode of the edge device 104 from the first power mode to the second power mode after the defined time-interval. The hardware processor 202 may be further configured to control the edge device 104 to capture the first image 110 of the first scene. The hardware processor 202 may be further configured to determine a trigger point based on a detection of the plurality of objects in the captured first image 110. The hardware processor 202 may be further configured to change the operational mode of the edge device 104 from the second power mode to the third power mode at the determined trigger point. The operational mode of the edge device 104 may be changed to control the consumption of electric power while the set of operations is executed at the edge device 104.

Various embodiments of the disclosure may provide a non-transitory computer-readable medium having stored thereon computer implemented instructions that when executed by the power management apparatus 102 provides a workflow to enable low power MR patient positioning on edge devices, such as the edge device 104. The power management apparatus 102 may execute operations comprising changing the operational mode of the edge device 104 from the first power mode to the second power mode after the defined time-interval. The power management apparatus 102 may execute further operations comprising controlling the edge device 104 to capture the first image 110 of the first scene. The power management apparatus 102 may execute further operations comprising determining a trigger point based on a detection of the plurality of objects in the captured first image 110. The power management apparatus 102 may execute further operations comprising changing the operational mode of the edge device 104 from the second power mode to a third power mode to control the consumption of electric power while a set of operations is executed at the edge device 104. The operational mode may be changed at the determined trigger point.

The power management apparatus 102 may execute further operations comprising changing, by the hardware processor 202, an operational mode of the edge device 104 from a first power mode to a second power mode after a defined time-interval. The power management apparatus 102 may execute further operations comprising controlling the edge device 104 to capture the first image 110 of a first scene. The power management apparatus 102 may execute further operations comprising determining a trigger point based on a detection of the plurality of objects in the captured first image 110. The power management apparatus 102 may execute further operations comprising changing the operational mode of the edge device 104 from the second power mode to a third power mode at the determined trigger point to control the consumption of electric power while a set of operations is executed at the edge device 104.

In accordance with an embodiment, the power management apparatus 102 may execute further operations comprising applying one or more object detection operations on the captured first image 110 of the first scene. The power management apparatus 102 may execute further operations comprising detecting the plurality of objects in the captured first image 110 based on the application of the one or more object detection operations on the captured first image 110 and determining the trigger point based on the detection of the plurality of objects in the captured first image 110.

In accordance with an embodiment, the power management apparatus 102 may execute further operations comprising determining a position of at least one object of the plurality of objects in the first scene based on the captured first image 110. The power management apparatus 102 may execute further operations comprising determining the trigger point further based on the determined position of the at least one object of the plurality of objects.

In accordance with an embodiment, the power management apparatus 102 may execute further operations comprising determining whether the plurality of objects is detected in the captured first image 110. The power management apparatus 102 may execute further operations comprising may further include changing the operational mode of the edge device 104 from the second power mode to the first power mode for the defined time-interval based on a determination that the plurality of objects is not detected in the captured first image 110.

In accordance with an embodiment, the operational mode of the edge device 104 may be changed from one of the second power mode or the third power mode to the first power mode based on at least one of switching the power management apparatus 102 to a sleep mode for the defined time-interval or disabling at least one core of the one or more cores of the hardware processor 202 for the defined time-interval. The operational mode of the edge device 104 may be changed from one power mode to another power mode based on a change in a supply of electric power to at least one component of one or more components of the power management apparatus 102 for the controlled consumption of the electric power.

In accordance with an embodiment, a first amount of the electric power may be consumed by the edge device 104 in the first power mode, a second amount of the electric power may be consumed by the edge device 104 in the second power mode, and a third amount of the electric power may be consumed by the edge device 104 in the third power mode.

In accordance with an embodiment, the third amount of the electric power is greater than the second amount of the electric power and the second amount of electric power is greater than the first amount of the electric power.

In accordance with an embodiment, the edge device 104 may correspond to an image sensor-based electronic device and the first scene may be associated with a medical scanning environment.

In accordance with an embodiment, the plurality of objects may include at least a first object 112A that is being scanned and a second object 112B that may be designated to perform a scan on the first object 112A in the medical scanning environment.

In accordance with an embodiment, the power management apparatus 102 may execute further operations comprising receiving a first user input associated with an initiation of an execution of the set of operations. The power management apparatus 102 may execute further operations comprising controlling the edge device 104 to capture the first image 110 of the first scene based on the received first user input. The power management apparatus 102 may execute further operations comprising changing, based on the received first user input, the operational mode of the edge device 104 from one of the first power mode or the second power mode to the third power mode to control the consumption of the electric power while the set of operations is executed at the edge device 104.

In accordance with an embodiment, the power management apparatus 102 may execute further operations comprising receiving a second user input associated with the defined time-interval and modifying a value of the defined time-interval from a first value to a second value based on the received second user input.

In accordance with an embodiment, the power management apparatus 102 may execute further operations comprising generating an output based on the execution of the set of operations at the edge device 104. The set of operations may be executed on the captured first image 110. The power management apparatus 102 may execute further operations comprising controlling the display device 106 to display the generated output.

As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for generating a novel molecular structure using a protein structure.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. An edge device, comprising:
a hardware processor configured to:
 change an operational mode of the edge device from a first power mode to a second power mode after a defined time-interval;
 control the edge device to capture a first image of a medical environment that includes a medical scanner,
 determine a trigger point based on the captured first image, wherein the hardware processor is configured to:
  detect a patient in the captured first image;
  determine a position of the patient associated with the medical scanner; and
  determine that the trigger point has been reached based at least on the position of the patient associated with the medical scanner; and
 change, at the trigger point, the operational mode of the edge device from the second power mode to a third power mode.

2. The edge device according to claim 1, wherein the hardware processor is further configured to:
 detect a plurality of objects in the captured first image; and
 determine that the trigger point has been reached based further on the detection of the plurality of objects detected in the captured first image.

3. The edge device according to claim 2, wherein the plurality of objects detected in the captured first image includes at least a part of the medical scanner and a technician, and wherein the hardware processor is configured to determine that the trigger point has been reached in response to determining, based on the captured first image, that the patient is in contact with the part of the medical scanner and that the technician is present in the medical environment.

4. The edge device according to claim 1, wherein the hardware processor is further configured to:
 determine whether an object is detected in the captured first image; and
 change the operational mode of the edge device from the second power mode back to the first power mode based on a determination that the object is not detected in the captured first image.

5. The edge device according to claim 1, wherein the hardware processor is configured to disable at least one core of the hardware processor for the defined time-interval while the edge device is in the first power mode.

6. The edge device according to claim 1, wherein a first amount of electric power is consumed by the edge device in the first power mode, a second amount of electric power is consumed by the edge device in the second power mode, and a third amount of electric power is consumed by the edge device in the third power mode.

7. The edge device according to claim 6, wherein the third amount of electric power is greater than the second amount of electric power, and the second amount of electric power is greater than the first amount of electric power.

8. The edge device according to claim 1, wherein the edge device includes an image sensor configured to capture the first image.

9. The edge device according to claim 1, wherein the hardware processor is further configured to:
 receive a user input associated with an execution of a set of operations; and
 change, based on the user input, the operational mode of the edge device from one of the first power mode or the second power mode to the third power mode to execute the set of operations at the edge device.

10. The edge device according to claim 1, wherein the hardware processor is further configured to:
 receive a user input associated with the defined time-interval; and
 modify a length of the defined time-interval from a first value to a second value based on the user input.

11. The edge device according to claim 1, wherein the hardware processor is further configured to:
 generate an output associated with positioning of the patient while the edge device is in the third power mode; and
 control a display device to display the generated output while the edge device is in the third power mode.

12. A method implemented by an edge device, the method comprising:
 changing an operational mode of the edge device from a first power mode to a second power mode after a defined time-interval;
 capturing a first image of a medical environment that includes a medical scanner;
 determining a trigger point based on the captured first image, wherein the determining comprises:
  detecting a patient in the captured first image;
  determining a position of the patient associated with the medical scanner; and
  determining that the trigger point has been reached based at least on the position of the patient associated with the medical scanner; and
 changing the operational mode of the edge device from the second power mode to a third power mode at the trigger point.

13. The method according to claim 12, further comprising:
 detecting a plurality of objects in the captured first image; and
 determining that the trigger point has been reached further based on the detection.

14. The method according to claim 13, wherein the plurality of objects detected in the captured first image includes at least a part of the medical scanner and a technician, and wherein the determination that the trigger point has been reached is made in response to determining, based on the captured first image, that the patient is in contact with the part of the medical scanner and that the technician is present in the medical environment.

15. The method according to claim 12, further comprising:
 determining whether an object is detected in the captured first image; and
 changing the operational mode of the edge device from the second power mode back to the first power mode based on a determination that the object is not detected in the captured first image.

16. The method according to claim 12, wherein a first amount of electric power is consumed by the edge device in the first power mode, a second amount of electric power is consumed by the edge device in the second power mode, and a third amount of electric power is consumed by the edge device in the third power mode.

17. The method according to claim 16, wherein the third amount of electric power is greater than the second amount of electric power, and the second amount of electric power is greater than the first amount of electric power.

18. The method according to claim 12, further comprising:
   receiving a user input associated with an execution of a set of operations; and
   changing, based on the user input, the operational mode of the edge device from one of the first power mode or the second power mode to the third power mode to execute the set of operations at the edge device.

19. A computer program product comprising a non-transitory computer-readable medium including computer program instructions, which when executed by an edge device, cause the edge device to perform one or more operations comprising:

changing an operational mode of the edge device from a first power mode to a second power mode after a defined time-interval;

capturing a first image of a medical environment that includes a medical scanner;

determining a trigger point based on the captured first image, wherein the determining comprises:
   detecting a patient in the captured first image;
   determining a position of the patient associated with the medical scanner; and
   determining whether the trigger point has been reached based at least on the position of the patient associated with the medical scanner; and changing, at the trigger point, the operational mode of the edge device from the second power mode to a third power mode.

* * * * *